Feb. 14, 1933. J. SEVERIN 1,897,770
APPARATUS FOR ROLLING SEAMLESS TUBES
Filed July 6, 1928   3 Sheets-Sheet 1
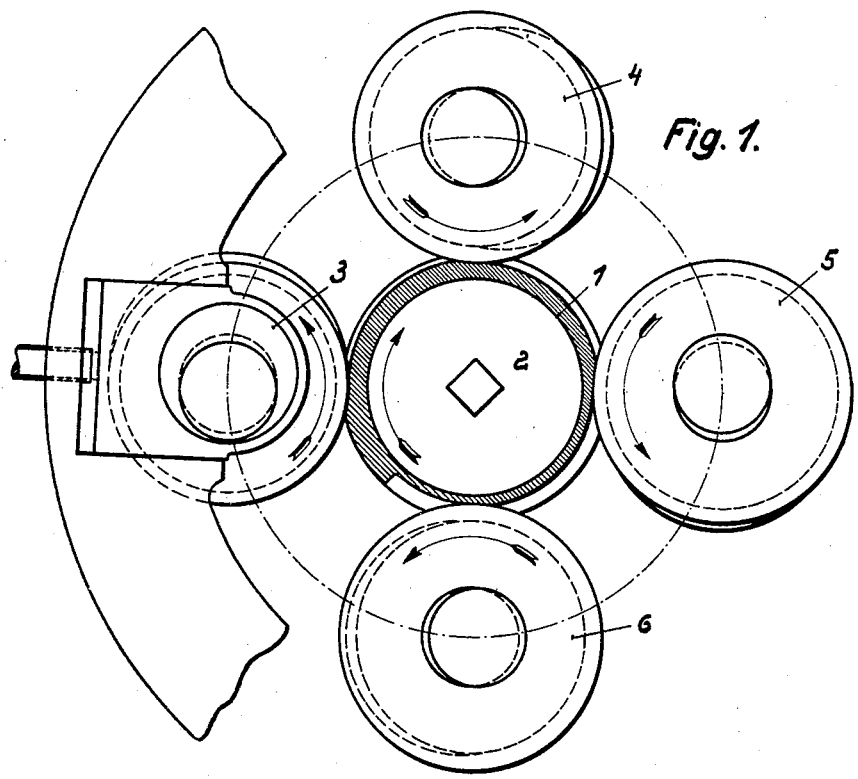
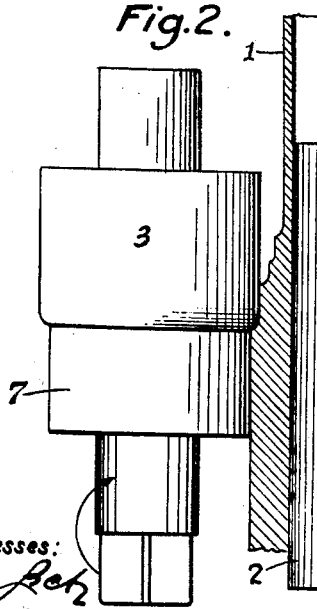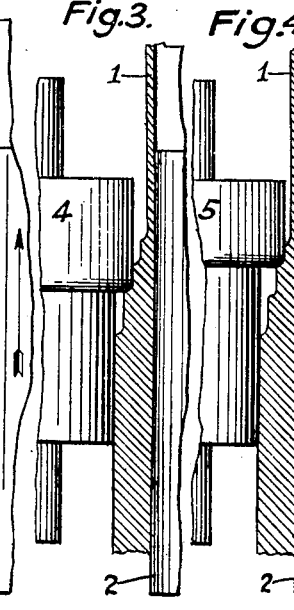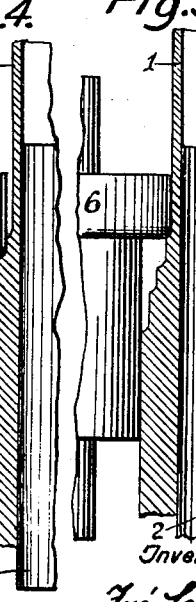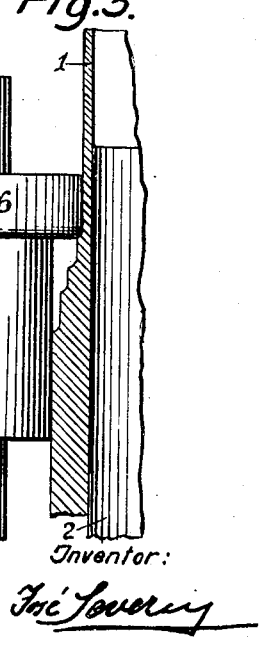

Feb. 14, 1933. J. SEVERIN 1,897,770
APPARATUS FOR ROLLING SEAMLESS TUBES
Filed July 6, 1928   3 Sheets-Sheet 2

Feb. 14, 1933.　　　　J. SEVERIN　　　　1,897,770
APPARATUS FOR ROLLING SEAMLESS TUBES
Filed July 6, 1928　　　3 Sheets-Sheet 3

Witnesses:

Inventor:

Patented Feb. 14, 1933

1,897,770

UNITED STATES PATENT OFFICE

JOSÉ SEVERIN, OF MULHEIM-ON-THE-RUHR, GERMANY

APPARATUS FOR ROLLING SEAMLESS TUBES

Application filed July 6, 1928, Serial No. 290,863, and in Germany July 16, 1927.

I have filed application for patent in Germany on 16th July, 1927, No. S. 80,708 I/7a.

The commonly used methods of manufacturing seamless pipes all present the inconvenience that considerable frictional resistances and shocks and blows occur. The invention avoids these inconveniences essentially by the combination and practical alteration of two known metal-working methods, that is of the method of manufacturing seamless pipes by means of calibrated rings through which the pipe placed on a calibrated rod is drawn, and secondly of the method frequently applied at rolling, forging and pressing, according to which the alteration of form of the material acted upon is considerably influenced by the surrounding material which is not actually being worked on, the material which is actually being acted upon by the tool flowing always towards the side of the lowest resistance. When, for instance, a pressing ram presses upon the edge of a billet placed under the same on an anvil, the pressed material is forced to yield in forward direction, this being the only free side, as the surrounding material not acted upon by the pressing ram positively prevents spreading strongly impedes yielding towards the other sides. It is evident, that the depth to which the ram is pressed-in depends entirely on the kind of the material to be treated, on the thickness of the same and on the working speed. The material will be spread less the shallower the pressing depth is in relation to the thickness and width of the billet.

In order to combine these two methods, which have already been applied in the art of metal working, for manufacturing seamless pipes according to the invention, the anvil has to be imagined to form the mandrel, the work as a hollow block on said mandrel, and the ram as the body of a roll. The hollow block must then be stretched to form a pipe without considerable enlargement of the diameter, as soon as it is pushed forward together with the mandrel. The feeding of the hollow block is obtained, according to the invention, by an inclined position of several rolls, this inclined position of the rolls being known per se from the rolling of seamless pipes. According to the invention, however, the rolls are given a certain calibration similar or approximately similar to the calibration of draw rings, which have hitherto been used for the manufacturing of similar seamless pipes.

Several embodiments of the invention and examples of carrying out the improved method are illustrated, by way of example, in the accompanying drawings, in which Fig. 1 illustrates diagrammatically the rolling process according to the new method.

Figs. 2, 3, 4 and 5 are each a diagrammatical illustration of the action of the four rollers shown in Fig. 1 upon the hollow block, the axes of the rolls being shown parallel to that of the mandrel for the sake of clearness, whereas in reality they are at an incline thereto.

Figure 6:
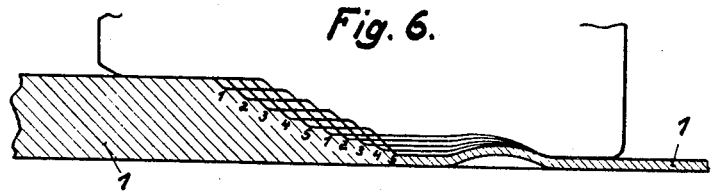
Fig. 6 is a diagram, showing the outlines of the rolls superposed.
Figure 7:
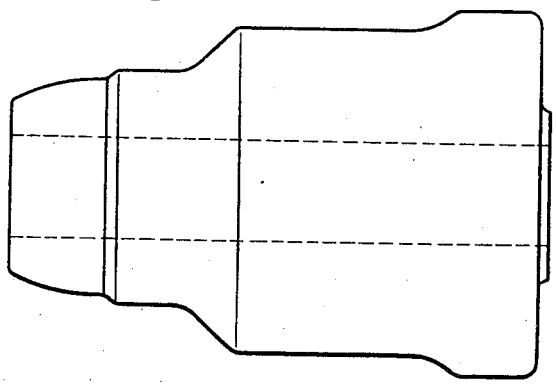
Figs. 7 to 11 show each one of the rolls diagrammatically indicated in Fig. 6.
Figure 8:
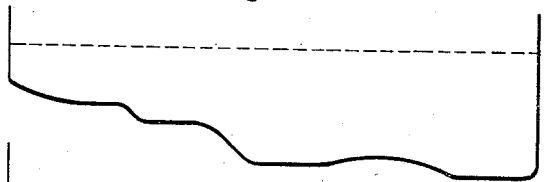
Figure 9:
Figure 10:
Figure 11:
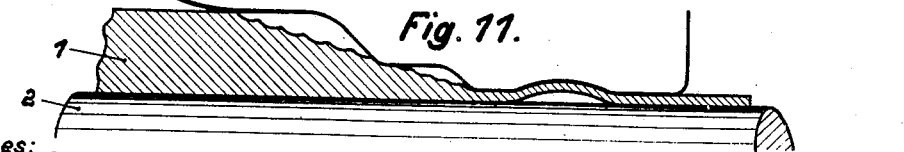

For carrying out the new method a number of rolls, circulating planet-like around the hollow block, are substituted for the hitherto used draw rings, said rolls acting upon said hollow block from the other side. In the hollow block 1 a calibrated rod 2 is inserted, so that it can be shifted in longitudinal direction together with the hollow block. The rolls are inclined in relation to the axis of the block, their inclined position being in accordance with the velocity of feed as has become known from the Mannesmann rolling mills. The rolls 3, 4, 5, 6 (Fig. 1) can then be driven as usual and, owing to their inclined position, feed the block axially through the rolling mill rotating the same around its axis. The whole roll casing might however roll on the block and owing to its inclined position pull the same through the rolling mill, without however rotating the same.

To facilitate the gripping of the hollow block by the rolls the portion 7 of the rolls, which comes first into contact with the block, is cylindrical or slightly conical, as has already become known from Mannesmann rolling mills. This portion 7 of each roll is continued by the calibrated portion 3, the generating line of which is similar to that of a draw ring. The rolls 3, 4, 5 and 6, circulating planet-like around the block, enclose therefore an annular space, the generating line of which is similar to the generating line of the ring surface of a drawing ring, that is the annular space tapers substantially similarly to a draw ring, the narrowest cross section being equal to the desired outer diameter of the pipe. By the rolling of the rolls on the hollow block the strong sliding friction, which occurs at the draw-ring process, will not occur but is for the greatest part only replaced by rolling friction. The main advantage consists however in that the surface of the hollow block actually being worked by each roll is comparatively small and surrounded by material which is not being treated. This material which is not being treated, as stated above, offers resistance to the alteration of shape and forces the material, which is actually being subjected to the roll pressure, to flow towards the side of the lowest resistance, i. e. forward in the direction in which the hollow block is being fed. A reduction of the thickness of the wall with simultaneous stretching is consequently obtained without considerably enlarging the pipe diameter.

The amount of the reduction of the pipe can be carried out according to the temperature and quality of the material.

As can be seen from Figs. 2, 3, 4 and 5 of the drawings the rolls which act consecutively on the block 1, stretch the metal in steps, the roll 3 (Fig. 2) first engaging the block and forming a step thereon. The roll 4 (Fig. 4) engages in this step and further extends the material reducing the wall thickness accordingly. The roll 5 (Fig. 4) then cuts further into the step formed by the roll 4, and finally the roll 6 (Fig. 5) engages in the step formed by the roll 5; the desired wall thickness being thus obtained. It should be pointed out that for the sake of clearness the axes of the rolls are shown parallel to that of the mandrel in Figs. 2, 3, 4 and 5, whereas in reality they are inclined thereto, in order to effect a feed of the block. Moreover attention is called to the fact that the calibrated beads or collars 3, 4, 5 and 6 are not the same length but become gradually narrower from 3 to 6. Thus the material can stretch freely from one step to the next and its flow is not checked as in the known rolling mills, so that the known processes can either only be carried out with the employment of extremely great force or even in some instances are unpracticable altogether.

The beads 3, 4, 5 and 6 of the calibrated rolls may be independent of the portion 7 of the same.

In Figs. 6 to 15 several possibilities of calibration, arrangements and other constructions of the rolls are shown.

Fig. 6 supposes five rolls the outlines of which are imagined to be superposed, whereby the position of the consecutively working calibrated beads is illustrated. A similar calibration of the same rolls is illustrated again in Figs. 7 to 11, Fig. 11 showing further the effect upon the hollow block 1.

Figure 12:
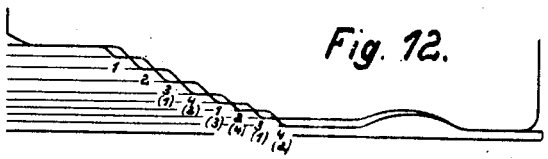
Figs. 12 to 15 show other embodiments of the invention.

Fig. 12 shows a diagram of four rolls, which work on the material successively in two groups, each two opposite rolls being similar. Each group of rolls works on another portion of material.

Figure 13:
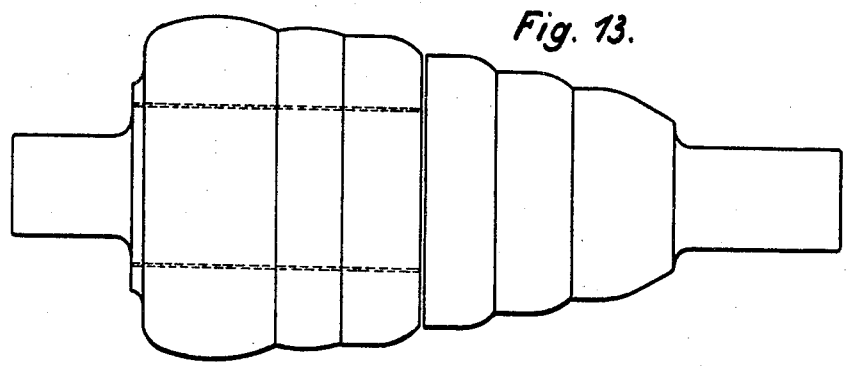

As shown in Fig. 13 all rolls, of which any number may be provided, are calibrated similarly and each roll works on a different portion of material. The several calibrated pieces belonging to one roll are each rotatable separately on their axle, so that each calibration piece can adjust itself to a revolving speed according to its circumference.

Figure 14:
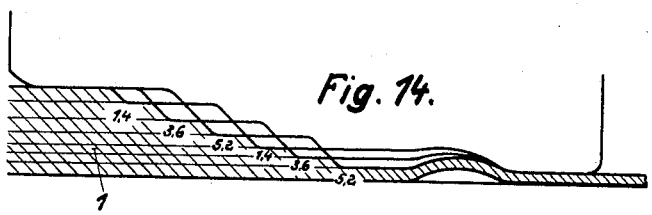
Figure 15:
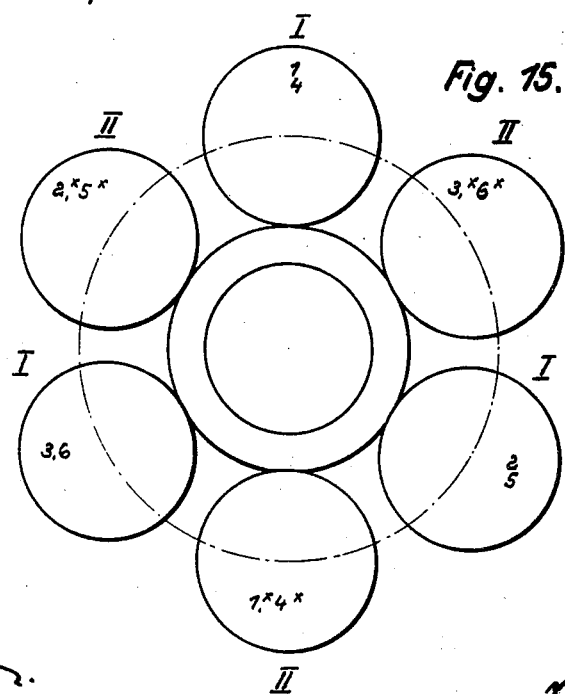

In Figs. 14 and 15 six rolls are supposed, co-operating in two groups of three, which are designated by I and II. The several rolls of group I are designated by numerals without exponent, the rolls of group II being designated by the same numerals with the exponent X. Each of the two groups engages the material at a different point. The rolls alternate in the two groups, as can be seen in Fig. 15.

What I claim, is:

1. In an apparatus for forming seamless tubes, a plurality of rolls equally spaced about the outer circumference of a hollow block to be reduced, a mandrel to support said block between the rolls, said rolls being positioned with their axes obliquely to the axis of said block so that the block will be fed forwardly, each roll having an enlarged reducing portion, such portions being arranged to successively act in said block, each successively acting reducing portion being set farther back in the direction of extension of the hollow block and having a larger diameter than the reducing portion preceding it and adapted to further reduce that portion of said block reduced by a previously acting reducing portion, thereby to gradually and simultaneously reduce and elongate said hollow block into a seamless tube.

2. Apparatus according to claim 1, in which each roll has a plurality of reducing portions of different diameter, the reducing portions engaging successively the hollow block.

3. Apparatus according to claim 1, in which each roll has a plurality of reducing portions of different diameter and the rolls having reducing portions of the same diameter are arranged in cooperating groups.

4. Apparatus according to claim 1, in which each roll has a plurality of reducing portions of different diameter, the reducing portions having the same diameter engaging simultaneously the hollow block.

5. Apparatus according to claim 1, in which the reducing portions arranged on each roll are individually rotatably disposed on their axes.

In testimony whereof I have hereunto set my hand:

JOSÉ SEVERIN.